(12) United States Patent
Specht et al.

(10) Patent No.: US 9,235,044 B2
(45) Date of Patent: Jan. 12, 2016

(54) LIGHT ACTIVATED POWER INDICATOR

(71) Applicant: The Gillette Company, Boston, MA (US)

(72) Inventors: Steven Jeffrey Specht, Brookfield, CT (US); Jordan Todorov Bourilkov, Bethel, CT (US)

(73) Assignee: The Gillette Company, Boston, MA (US)

( * ) Notice: Subject to any disclaimer, the term of this patent is extended or adjusted under 35 U.S.C. 154(b) by 110 days.

(21) Appl. No.: 14/167,337

(22) Filed: Jan. 29, 2014

(65) Prior Publication Data

US 2015/0212315 A1  Jul. 30, 2015

(51) Int. Cl.
| | | |
|---|---|---|
| *G06F 17/00* | (2006.01) | |
| *G02B 26/00* | (2006.01) | |
| *G02F 1/167* | (2006.01) | |
| *G02F 1/15* | (2006.01) | |
| *G01R 31/36* | (2006.01) | |
| *H01M 6/50* | (2006.01) | |
| *H02J 7/00* | (2006.01) | |
| *H05B 37/02* | (2006.01) | |
| *H01M 10/48* | (2006.01) | |

(52) U.S. Cl.
CPC .......... *G02B 26/005* (2013.01); *G01R 31/3686* (2013.01); *G02F 1/15* (2013.01); *G02F 1/167* (2013.01); *H01M 6/5044* (2013.01); *H02J 7/0047* (2013.01); *H05B 37/0218* (2013.01); *H01M 10/488* (2013.01); *H02J 2007/005* (2013.01)

(58) Field of Classification Search
CPC ......... G08B 26/005; G02F 1/15; G02F 1/167; G01R 31/3686; H01M 10/488; H01M 6/5044; H02J 7/0047; H02J 2007/005; H05B 37/0218
USPC ............... 340/815.4, 636.1, 636.13; 320/132, 320/DIG. 18, DIG. 19; 200/61.02, DIG. 36; 429/93
See application file for complete search history.

(56) References Cited

U.S. PATENT DOCUMENTS 3,706,357 A * 12/1972 Simpson .................. 187/290
4,394,613 A *  7/1983 Cole ........................ 320/164

(Continued)

FOREIGN PATENT DOCUMENTS

EP          0 523 901 A1    1/1993
WO     WO 2005034303 A1 *  4/2005 ............... H02J 7/04

OTHER PUBLICATIONS

PCT International Search Report with Written Opinion in corresponding int'l appl. PCT/US2015/012398 dated Apr. 2, 2015.

(Continued)

*Primary Examiner* — Daniel Wu
(74) *Attorney, Agent, or Firm* — Leo J. White; Kevin C. Johnson; Steven W. Miller (57) ABSTRACT

A light activated power indicator includes an indicator and a receptor circuit with a light sensitive device electrically connected to the indicator. The light activated power indicator further includes a first terminal electrically coupled to a first end of the receptor circuit and a second terminal electrically coupled to a second end of the receptor circuit wherein the indicator indicates a state of charge of an electrical storage device when the light sensitive device is exposed to one or more wavelengths lying within a response spectrum.

16 Claims, 8 Drawing Sheets

(56) References Cited

U.S. PATENT DOCUMENTS

| | | | |
|---|---|---|---|
| 5,250,905 A | 10/1993 | Kuo et al. | |
| 5,458,992 A | 10/1995 | Bailey | |
| 5,580,675 A * | 12/1996 | Rouhani | 429/90 |
| 5,596,278 A | 1/1997 | Lin | |
| 5,654,640 A | 8/1997 | Bailey | |
| 5,667,538 A | 9/1997 | Bailey | |
| 5,672,440 A | 9/1997 | Bailey | |
| 5,699,050 A * | 12/1997 | Kanazawa | 340/636.13 |
| 5,737,114 A | 4/1998 | Bailey | |
| 5,742,424 A | 4/1998 | Coleman | |
| 5,849,046 A | 12/1998 | Bailey | |
| 6,587,250 B2 | 7/2003 | Armgarth et al. | |
| 6,900,615 B2 * | 5/2005 | Kamenoff | 320/127 |
| 7,158,277 B2 | 1/2007 | Berggren et al. | |
| 7,301,687 B2 | 11/2007 | Berggren et al. | |
| 7,482,620 B2 | 1/2009 | Kugler et al. | |
| 7,489,431 B2 | 2/2009 | Malmstroem et al. | |
| 7,894,177 B2 | 2/2011 | Rothkopf | |
| 2003/0201755 A1 * | 10/2003 | Briggs et al. | 320/135 |
| 2004/0164715 A1 | 8/2004 | Nawa et al. | |
| 2006/0097699 A1 * | 5/2006 | Kamenoff | 320/132 |
| 2012/0000974 A1 * | 1/2012 | Hung et al. | 235/375 |
| 2012/0038967 A1 | 2/2012 | Copeland et al. | |
| 2012/0204925 A1 * | 8/2012 | Lyden | 136/244 |
| 2012/0268017 A1 | 10/2012 | Griffiths et al. | |
| 2013/0043827 A1 | 2/2013 | Weinstein et al. | |
| 2014/0370344 A1 * | 12/2014 | Lovelace et al. | 429/90 |
| 2015/0102762 A1 * | 4/2015 | Goei et al. | 320/101 |

OTHER PUBLICATIONS

Fonderie, J., et al., 1-Volt Operational Amplifier With Rail-to-Rail Input and Output Ranges, Solid-State Circuits Conference, 1989, pp. 64-65, Digest of Technical Papers, 36th ISSCC, 1989 IEEE, New York, USA.

* cited by examiner

LIGHT ACTIVATED POWER INDICATOR

TECHNICAL FIELD

The present disclosure is generally directed to indicator apparatuses for electrical storage devices.

BACKGROUND

On-cell indicators require a user to press one or two buttons, wait for several seconds and then observe an indicator that shows the state of charge of the battery. This is inconvenient for the users because they must remove the batteries from the device, hold the battery and press the button(s). The user must then reinstall the battery into the device. This is cumbersome and time consuming.

Electrochromic displays draw very little power from the cell being tested and can therefore remain on and allow the consumer to just look at the cell to determine the state of charge. However, the current state-of the-art in electrochromic indicator technology has short operational life if it is continuously powered in the on condition. The short operational life could be as short as a few weeks to as long as about a couple of months.

Accordingly, a need exists for improved on-cell indicators.

SUMMARY

In one embodiment, an apparatus for a light activated power indicator includes an indicator and a receptor circuit with a light sensitive device electrically connected to the indicator. The light activated power indicator further includes a first terminal electrically coupled to a first end of the receptor circuit and a second terminal electrically coupled to a second end of the receptor circuit wherein the indicator indicates a state of charge of an electrical storage device when the light sensitive device is exposed to one or more wavelengths lying within a response spectrum.

In another embodiment, a method for observing a state of charge of an electrical storage device includes powering a light activated power indicator from an electrical storage device and deactivating the light activated power indicator when a light sensitive device is not exposed to one or more wavelengths lying within a response spectrum to reduce a power consumption of the light activated power indicator. The light activated power indicator includes an indicator and a receptor circuit. The receptor circuit includes the light sensitive device electrically coupled to the indicator. The light sensitive device includes electrical characteristics that change when the light sensitive device is exposed to one or more wavelengths lying within the response spectrum. The method further includes responding to exposure to one or more wavelengths lying within the response spectrum by changing electrical characteristics of the light sensitive device and determining a state of charge of the electrical storage device through an electrical potential provided across the indicator. The step of indicating the state of charge of the electrical storage device is done on the indicator.

In yet another embodiment, an apparatus for a light activated power indicator that operates in a presence of visible light to indicate a state of charge of a battery includes an indicator and a receptor circuit. The receptor circuit includes a leakage resistor electrically coupled to the indicator, a display resistor electrically coupled to the indicator, and a light sensitive device electrically coupled to the indicator. The light sensitive device includes electrical characteristics that change when the light sensitive device is exposed to one or more wavelengths lying within a response spectrum. The apparatus further includes a battery having a first electrode and a second electrode, the first electrode is electrically coupled to a first end of the receptor circuit and the second electrode electrically coupled to a second end of the receptor circuit. The apparatus operates by the indicator indicating a state of charge of the battery when the light sensitive device is exposed to one or more wavelengths lying within the response spectrum.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The light activated power indicator indicates the amount of energy remaining in a battery and includes a light sensitive element and an indicator circuit. The indicator circuit is designed to minimize and/or eliminate power usage of the indicator circuit when the battery is not visible to a consumer. The light activated power indicator generally comprises a circuit having a light sensitive device and a display for indicating a state of the charge of the battery. The light activated power indicator may be coupled to the battery and receive its power from the battery. The display of the light sensitive device has at least two display states: an off display state and an on display state. In the off display state, the display does not indicate the state of the charge of the battery and the display may be considered deactivated. Alternatively, in the on display state, the display does indicate the state of the charge of the battery and the display may be considered activated. Exposure of the light sensitive device to the electromagnetic spectrum dictates which display state the light activated power indicator is in. Various embodiments of the light activated power indicator and the operation of the light activated power indicator will be described in more detail herein.

Figure 1:
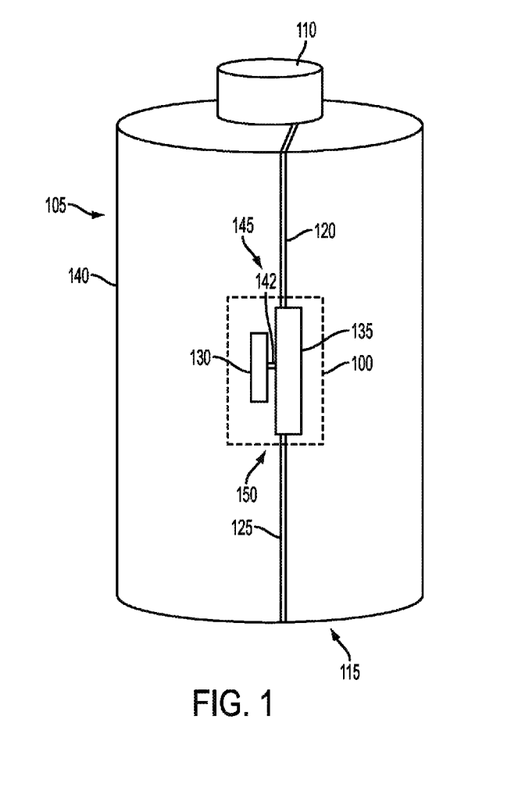
FIG. 1 depicts one embodiment of a light activated power indicator according to one or more embodiments shown and described herein.

Referring now to FIG. 1, a light activated power indicator 100 may be coupled to an electrical storage device 105. The electrical storage device 105 may include a first electrode 110 and a second electrode 115. In one embodiment, the electrical storage device 105 may be one or more battery cells or one or more batteries. The one or more battery cells may be, for example, disposable (e.g. one-time discharge) or they may be rechargeable (e.g. multiple-time charge/discharge). For example, the battery may be a rechargeable battery, a fuel cell, a stack of coin batteries, or a stack of cylindrical batteries. The light activated power indicator 100 is generally shown within the imaginary box and may include a first terminal 120 and a second terminal 125. The first terminal 120 may be electrically coupled to the first electrode 110 and the second terminal 125 may be coupled to the second electrode 115. Alternatively, the first terminal 120 may be electrically coupled to the second electrode 115 and the second terminal 125 may be coupled to the first electrode 110. The first electrode 110 and the second electrode 115 may be, for example, positive and negative respectively or vice versa. The first terminal 120 and the second terminal 125 may enable the light activated power indicator 100 to sense the state of charge of the electrical storage device 105. The first terminal 120 and the second terminal 125 may also be used to power the light activated power indicator 100.

In another embodiment, the electrical storage device 105 may be a capacitor (not shown). The capacitor may have a positive lead and a negative lead. The first terminal may be electrically coupled to the positive lead of the capacitor and the second terminal may be electrically coupled to the negative lead of the capacitor or vice versa.

Figure 2:
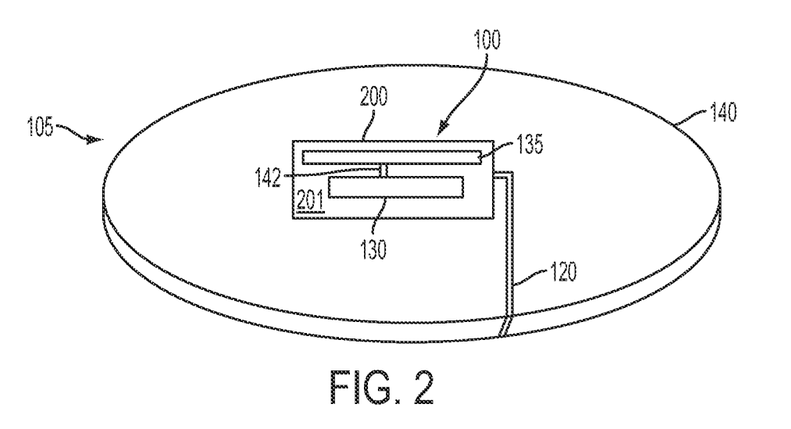
FIG. 2 is another embodiment of the light activated power indicator according to one or more embodiments shown and described herein.
Figure 7:
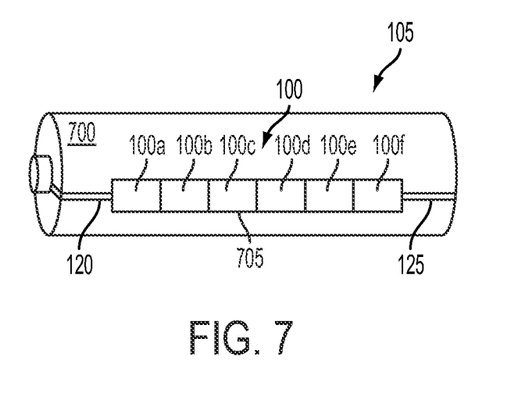
FIG. 7 depicts a segmented strip indicator according to one or more embodiments shown and described herein.

The light activated power indicator 100 may be coupled to a housing 140 of the electrical storage device 105. In one embodiment, the coupling of the light activated power indicator 100 to the housing 140 may be accomplished by an adhesive or by mechanical attachment such as screws, bolts, clamps, tabs, snaps, snap-fit connections, welding, soldering, and the like. In another embodiment, the coupling of the light activated power indicator 100 to the housing 140 may be accomplished by printing the light activated power indicator 100, first terminal 120, second terminal 125, and circuit traces 142 on the housing 140. In yet another embodiment, the coupling of the light activated power indicator 100 to the housing 140 may be accomplished by printing the light activated power indicator 100, first terminal 120, second terminal 125, and circuit traces 142 on a substrate (e.g. a substrate 200 as shown in FIG. 2 or a label 700 as shown in FIG. 7). The circuit traces 142 are generally shown in FIG. 1 and are not representative of all the circuit traces required. In all embodiments, the electrically coupling of the components of the light activated power indicator 100 may be done by conductive glue, soldering, welding, mechanical fastener such as a compression clamp or rivet, or through overlapping printing of the components to form electrically conductive bridges between printings. Conductive glue may be used to minimize resistance between connection points within the light activated power indicator 100. For example, conductive glue may be used to electrically couple the first terminal 120 and the second terminal 125 to the first electrode 110 and the second electrode 115.

Printing may include, but is not limited to, the following techniques: a radio frequency (RF) sputtering technique, an impact or pressure technique, a mask and etch technique, or a heat or light activated technique. These printing techniques are used to apply a material such as copper, plastic, silver, carbon, graphite or epoxy, electrochromic and other indicator materials, photovoltaic cell materials, semiconductor material and the like to a subject surface with a machine or a process. The machine or process may be operable to define the components of the light activated power indicator 100 through the use of a screen, gravure, or ink jet printing. The subject surface may include the substrate 200, the housing 140, or both.

Figure 5:
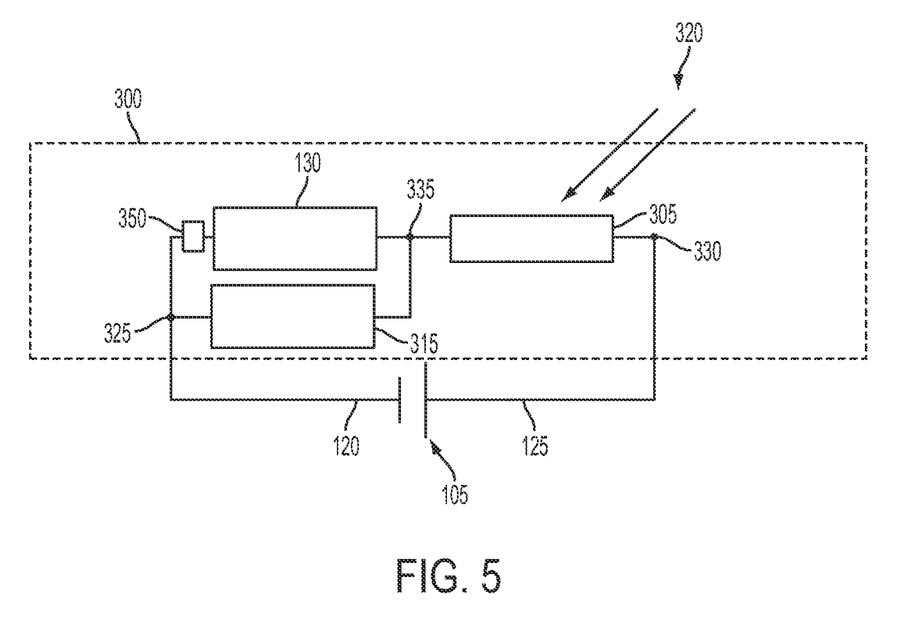
FIG. 5 depicts a series receptor circuit according to one or more embodiments shown and described herein.

The light activated power indicator 100 may have a receptor circuit 135 that is connected to and/or includes an indicator 130. Although indicator 130 is shown in FIG. 1 as separate from the receptor circuit 135, it is understood that the indicator 130 may be a part of and connected within the receptor circuit 135. The receptor circuit 135 may have a first end 145 and a second end 150. The first end 145 may define a first node (e.g. a first node 325 shown in FIG. 5 and described below herein). The second end 150 may define a second node (e.g. a second node 330 as shown in FIG. 5 and described below herein). The first terminal 120 may be electrically coupled to the first end 145, and the second terminal 125 may be electrically coupled to the second end 150. In one embodiment, the components of the receptor circuit 135 may be printed directly on the indicator 130.

The receptor circuit 135 may include a light sensitive device and one or more resistors. As throughout the disclosure, the light sensitive device may be any discrete component that changes its electrical characteristics (e.g. resistance, voltage, or current) in response to being exposed to one or more wavelengths of the electromagnetic spectrum. The light sensitive device may be configured to ensure that the light activated power indicator 100 is not powered or alternatively, minimally powered when a user does not want to know the state of charge of the electrical storage device 105. For example, the light sensitive device may be configured, designed, and/or chosen such that it only responds (i.e., changes its electrical characteristics) in response to a specific wavelength or range of wavelengths such as when a user opens a compartment containing the electrical storage device or opens packaging containing the electrical storage device 105. In other words, the electrical characteristics of the light sensitive device may be varied in response to varied exposure to the electromagnetic spectrum. Furthermore, the electrical characteristics of the light sensitive device may be varied in response to the intensity of the electromagnetic spectrum and/or the position and orientation between the source of the electromagnetic spectrum and the light sensitive device. Herein, the term "response spectrum" refers to those wavelengths (or frequencies) of the electromagnetic spectrum that the light sensitive device responds to by changing its electrical characteristics. For example, if the light sensitive device is exposed to some portion of the electromagnetic spectrum but that portion of the electromagnetic spectrum does not include the wavelengths lying within the response spectrum, the light sensitive device will not respond by changing its electrical characteristics. The light sensitive device may comprise a photoresistor (i.e. light dependent resistor), photodiode, phototransistor, or a solar cell.

Still referring to FIG. 1, the receptor circuit 135 may be an application specific integrated circuit (ASIC), one or more discrete components, and/or integrated components electrically coupled together. For example, in one embodiment, the receptor circuit 135 may include an op-amp (e.g. an op-amp 810 as shown and described in FIG. 8) in an inverting amplification configuration. In another embodiment, the receptor circuit 135 may include a comparator circuit that determines when the light sensitive device is exposed to the wavelengths lying within the response spectrum or not. The comparator circuit may compare the voltage or current from the light sensitive device to a threshold voltage or current to determine whether to indicate the state of charge of the electrical storage device 105 or not. In yet another embodiment, the receptor circuit 135 may be a signal conditioner electrically coupled to a photovoltaic cell, where the photovoltaic cell acts as the light sensitive device. The signal conditioner may be required to manipulate the voltage or current from the photovoltaic cell in order to determine whether to indicate the state of charge of the electrical storage device 105 or not. In all these embodiments, the receptor circuit 135 provides a light dependent, variable electrical characteristic (e.g. voltage, current, and/or resistance) that enables the light activated power indicator 100 to respond to the wavelengths lying within the response spectrum. The various embodiments of the receptor circuit 135 are discussed in greater detail below.

Figure 3:
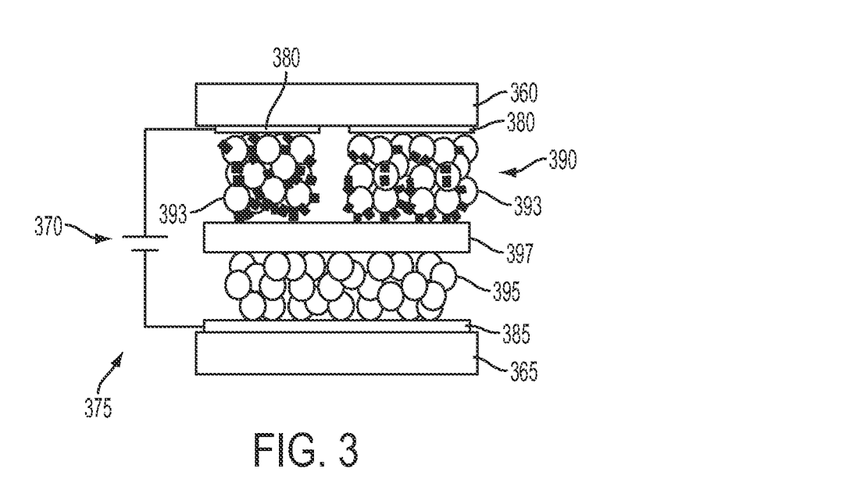
FIG. 3 depicts a sandwich type indicator circuit according to one or more embodiments shown and described herein.
Figure 4:
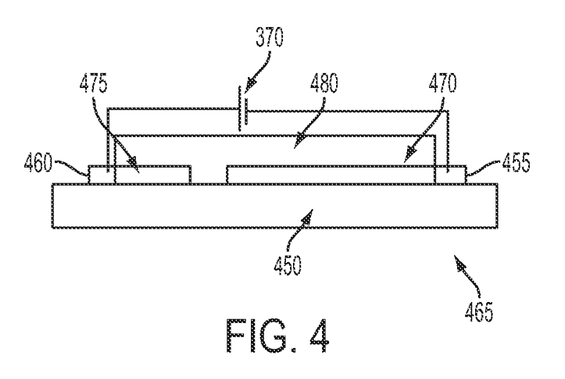
FIG. 4 depicts a flat type indicator according to one or more embodiments shown and described herein.

The indicator 130 may be used to receive a state of charge determination of the electrical storage device 105 from the receptor circuit 135 and indicate the state of charge determination using visual, audio, or other indicators and/or signals. In other words, the indicator 130 may be operable to indicate the state of charge of the electrical storage device 105. The indicator 130 may be a light-emitting diode (LED) display, a liquid-crystal display (LCD), an electro-chromic display, a thermochromic display, an electro-wetting display, a structural color display, electrophoretic display, and/or an electrostatic display. In one embodiment, the indicator 130 may be separate and distinct from the receptor circuit 135. For example, the indicator 130 may also be a standalone, dedicated circuit, or a display circuit. In another embodiment, the indicator 130 may be part of, connected within, and/or integrated with the receptor circuit 135 as shown in FIGS. 3 and 4. The indicator 130 may also be an audible device. For example, the receptor circuit 135 may monitor the state of charge of the electrical storage device 105 and when a charge threshold is met or exceeded, the indicator 130 may give an audible alert.

FIG. 2 is another embodiment of the light activated power indicator 100, wherein the light activated power indicator 100 is coupled to a substrate 200. The substrate 200 may be used to mount and secure light activated power indicator 100 to the electrical storage device 105. The substrate 200 may include a first side 201 and a second side that is opposite the first side 201. The coupling of the light activated power indicator 100 to the substrate 200 may be accomplished by an adhesive, or by mechanical attachment such as screws, bolts, clamps, tabs, snaps, snap-fit connections, and the like. Alternatively, the light activated power indicator 100 may be coupled to the substrate 200 by printing techniques as described above.

The substrate 200 may be a hard material, a flexible material, or a printed circuit board. The printed circuit board embodiment may include electrical traces 142 that electrically couple the components of the light activated power indicator 100 together. The circuit traces 142 are generally shown in FIG. 2 and are not representative of all the circuit traces required. In all embodiments, the electrically coupling of the components of the light activated power indicator 100 may be done by conductive glue, soldering, welding, mechanical fastener such as a compression clamp or rivet, or through overlapping printing of the components to form electrically conductive bridges between printings. Conductive glue may be used to minimize resistance between connection points within the light activated power indicator 100. The receptor circuit 135 and the indicator 130 may be coupled to the first side 201 of the substrate 200. The second side may be coupled to the housing 140 of the electrical storage device 105. In one embodiment, the electrical storage device 105 may be a button battery with only the first terminal 120 visible. The second terminal (not shown) may be coupled to the second side of the substrate 200 and electrically coupled with the housing 140. In another embodiment, if the substrate 200 is not used, the second terminal may penetrate an adhesive or other coupling means to electrically couple with the housing 140. In yet another embodiment, the receptor circuit 135 may include a short contact (not shown) that may be coupled to the second side and which may rest against the housing 140. The short contact may electrically couple the housing 140 with the second terminal.

The light sensitive device may be configured to vary its electrical characteristics across a range of wavelengths that lie within the response spectrum. For example, if the light sensitive device is a photoresistor, the resistance of the photoresistor may change from a low resistance up to a high resistance or vice versa, in response to exposure to the wavelengths lying within the response spectrum. Also, the light sensitive device may have a specific period of time that transpires as the electrical characteristics of the light sensitive device transitions across the range. For example, there is a transition time for a photoresistor to change from a first resistance (e.g. a low resistance) to a second resistance (e.g. a high resistance and/or intermediate resistance). The light sensitive device may further include an intermediate electrical characteristic that is disposed between the two extremes of range. For example, the photoresistor may have an intermediate resistance that is disposed between the high resistance and the low resistance. The intermediate resistance may be a result of the wavelengths of the electromagnetic spectrum that may be close to, but not the wavelengths lying within the response spectrum. The intermediate resistance may also be the result of the intensity of the response spectrum that is detected by the light sensitive device. As such, the light sensitive device responds by slightly changing its electrical characteristics. Continuing the example, the amount of current that the intermediate resistance allows through the photoresistor may provide for a dim indicator 130; however, the indicator 130 may still be readable. Furthermore, if the exposure to and/or the intensity of the wavelengths lying within the response spectrum of the electromagnetic spectrum is constant, the response of the light sensitive device may be constant. Alternatively, if the exposure to and/or the intensity of the wavelengths lying within the response spectrum of the electromagnetic spectrum is variable, the response of the light sensitive device may be variable. The variable response may still be limited between the two extremes of the range, for example the high resistance and the low resistance of the photoresistor.

The characteristics of the light sensitive device, such as those set forth above, may be dependent on the composition of the material of the light sensitive device. For example, the light sensitive device may be doped with silicon which results in the light sensitive device responding to the wavelengths lying within the response spectrum that are not a visible portion of the electromagnetic spectrum. In another embodiment, the light sensitive device may be a cadmium sulfide light sensitive device which results in the light sensitive device responding to the wavelengths lying within the response spectrum that are the visible portion of the electromagnetic spectrum. In yet another embodiment, the light sensitive device may be made from a doped material comprising at least one of the following: Lead Sulfide (PbS), Copper Oxide (CuO), Selenium Disulfide ($SeS_2$), Cadmium Sulfide (CdS), electrically conductive polymers (with or without doping), and any other metallic sulfides and oxides. Each doped material may coincide with a particular radiation wavelength(s) thereby changing the wavelength range of the response spectrum that the light sensitive device responds to.

The indicator 130 of FIG. 1 may be a sandwich type indicator 375 as shown in FIG. 3. Referring to FIGS. 1-3, the sandwich type indicator 375 may use electrochromic technology based on the migration of color-bearing particles under the influence of an electrical potential 370, sometimes referred to as a chromophoric system or chromophoretic system. The electrical potential 370 may be either the electrical motive force applied to the sandwich type indicator 375 from the electrical storage device 105 or it may be the circuit traces 142 to the receptor circuit 135 that delivers the electrical motive force to the sandwich type indicator 375 from an external power source. The electrical potential 370 is applied to a top electrode 380 and a bottom electrode 385 which are arranged opposite to each other. The arrangement of the top electrode 380 opposite of the bottom electrode 385 means that the sandwich type indicator 375 may act as a capacitor in a circuit. The top electrode 380 and the bottom electrode 385 may be made from indium tin oxide, aluminum, copper, or carbon. A working electrode 390 is formed by the electrochromic ink 393. A plurality of chromophoric particles 395 move through a separation layer 397 when the electrical potential 370 is applied. As the plurality of chromophoric particles 395 accumulate near the top electrode 380, a color change may become visible in the sandwich type indicator 375. The plurality of chromophoric particles 395 may return to the bottom electrode 385 when the electrical potential 370 is removed from the top electrode 380 and the bottom electrode 385. The separation layer 397 may include a reflective layer of ion permeable particles that reflect white light. A top substrate 360 and a bottom substrate 365 provide structural support for the sandwich type indicator 375 and may be clear (i.e. allow all visible wavelengths to pass through the substrate) or they may be opaque. In one embodiment, the top substrate 360 is clear to allow the accumulation of the plurality of chromophoric particles 395 to be visible at the top electrode 380.

The indicator 130 of FIG. 1 may be a flat type indicator 465 as shown in FIG. 4. Referring to FIGS. 1, 2, and 4, the flat type indicator 465 may use electrochromic technology based on the migration of color-bearing particles under the influence of an electrical potential 370, sometimes referred to as a chromophoric system or chromophoretic system. In this embodiment, instead of a layered structure of the sandwich type indicator 375 of FIG. 3, the indicator components are laid out on a common substrate 450. Referring to FIG. 4, the common substrate 450 may be a paper product, a plastic, a glass product, or a metal product. A first electrode 455 and a second electrode 460 are electrically coupled to the electrical potential 370. The first electrode 455 and the second electrode 460 may be made from indium tin oxide, aluminum, copper, or carbon or other suitable conductive material. The PEDOT:PSS is distributed between a first strip 470 electrically coupled to the first electrode 455 and a second strip 475 electrically coupled to the second electrode 460. A solid electrolyte 480 permits ionic conduction between 470 and the second strip 475 while preventing electronic conduction between the first electrode 455 and the second electrode 460. The prevention of electronic conduction means that the flat type indicator 465 may act as a capacitor in a circuit. As the electrical potential 370 is applied between the first electrode 455 and the second electrode 460, the PEDOT:PSS will oxidize, or change from the neutral state to the redox state to visibly darken in color. Examples of other electrochromic materials which are also suitable may include Prussian blue, tungsten oxides, nickel oxides, and organic materials that have been developed specifically for electrochromic displays.

Referring to FIGS. 3 and 4, the sandwich type indicator 375 or the flat type indicator 465 may indicate the state of charge of the electrical storage device 105 of FIG. 1 through the electrical potential 370 applied across the sandwich type indicator 375 or the flat type indicator 465. In other words, the amount of accumulation of chromophoric particles 395 and/or the amount of oxidation/reduction of the PEDOT:PSS is dependent upon the magnitude of the electrical potential 370 applied between the two electrodes (top electrode 380/bottom electrode 385 of FIG. 3 or first electrode 455/second electrode 460 of FIG. 4).

Referring to FIG. 1-4, in yet another embodiment of the indicator 130, an activated polymer may be used as a modulation mechanism. As the modulated mechanism, the activated polymer may have a reduction (redox) or neutral state and an oxidized state. The activated polymer may be PEDOT:PSS (i.e. poly(3,4-ethylenedioxythiophene)poly(styrenesulfonate)) and may darken when the electrical potential 370 is applied to the indicator 130 to drive it from its oxidized state to its redox or neutral state. In the neutral state, the activated polymer absorbs mainly the red to yellow part of the electromagnetic spectrum, giving the active polymer a strong blue color. In the oxidized state, the activated polymer turns almost transparent with a weak sky-bluish line of color. PSS appears completely transparent at visible light wavelengths.

Referring to FIG. 5, a series receptor circuit 300 is shown as an embodiment of the light activated power indicator 100 of FIGS. 1 and 2. Generally, the series receptor circuit 300 is shown within the imaginary box. In the series receptor circuit 300, a high resistance photoresistor 305 and an indicator 130 are electrically coupled in series. The first node 325 may comprise the first terminal 120 electrically coupled to the indicator 130. Alternatively, the first node may further comprise a leakage resistor 315 electrically coupled to a display resistor 350. The second node 330 may comprise the second terminal 125 electrically coupled to the high resistance photoresistor 305. A third node 335 may comprise the indicator 130 electrically coupled to the high resistance photoresistor 305. Alternatively, the third node may further comprise the leakage resistor 315 electrically coupled to the indicator 130 and the high resistance photoresistor 305. The first terminal 120 and the second terminal 125 may be electrically coupled to the electrical storage device 105.

The high resistance photoresistor 305 is a light sensitive device that has a high resistance when the high resistance photoresistor 305 is not exposed to the wavelengths lying within the response spectrum of the electromagnetic spectrum 320, a low resistance when the high resistance photoresistor 305 is exposed to the wavelengths lying within the response spectrum of the electromagnetic spectrum 320, and an intermediate resistance (i.e. resistances falling between the high resistance and the low resistance) dependent on the intensity of and/or the exposure to the wavelengths lying within the response spectrum of the electromagnetic spectrum 320 of the high resistance photoresistor 305. The high resistance of the high resistance photoresistor 305 may be the off display state of the series receptor circuit 300 and may not allow the indicator 130 to display the state of charge of the electrical storage device 105. The low resistance and/or the intermediate resistance of the high resistance photoresistor 305 may be an on display state of the series receptor circuit 300 and thus allow the indicator 130 to display the state of charge of the electrical storage device 105.

A leakage resistor 315 may be used in the series receptor circuit 300 to prevent a low leakage current through the high resistance photoresistor 305 from activating the indicator 130 when the photoresistor is in the off display state. The leakage resistor 315 may be electrically coupled in parallel with the indicator 130. The resistance of the leakage resistor 315 may be sized appropriately based on the set of characteristics of the high resistance photoresistor 305. The leakage resistor 315 may be sized to prevent current from "leaking" or prevent the flow of electric charge through the high resistance photoresistor 305 and drain power from the electrical storage device 105 during non-use of the electrical storage device 105. The leakage resistor 315 may be from about 500 kiloohm (kOhm) to about 2 megaohms (MOhms), or more preferable about 1 MOhm.

As an example, the high resistance of the cadmium sulfide light sensitive device may be greater than about 10 MOhms. When the resistance of the light sensitive device is high, very little current will flow through the light sensitive device. For example, current less than about 150 nanoAmps (nA) may flow from a 1.5 volt alkaline battery when the resistance of the light sensitive device is high. This response of the light sensitive device may provide a low voltage across the indicator 130. This low voltage across the indicator 130 may provide for an off display state or an unpowered state of indicator 130 which may allow for longer storage life of the electrical storage device 105. The low resistance of the cadmium sulfide light sensitive device may be between about 1 kOhm to about 100 kOhm and may correspond to between about 10 Lux to about 1000 Lux or more intensity of the wavelengths lying within the response spectrum. The low resistance of the high resistance photoresistor 305 may equate to the on display state of the indicator 130.

Still referring to FIG. 5, the high resistance photoresistor 305 is a light sensitive device with resistance as its electrical characteristic. The high resistance photoresistor 305 may be replaced with a phototransistor in the series receptor circuit 300. The phototransistor is a light sensitive device with current as its electrical characteristic. The phototransistor may vary the current between the third node 335 and the second node 330 in response to the wavelengths lying within the response spectrum instead of varying resistance as the high resistance photoresistor 305 would. Furthermore, the light sensitive device of FIG. 5 may be powered directly from the electrical storage device 105 if needed. For example, the photo transistor would require more than the second node 330 and the third node 335 to electrically couple within the series receptor circuit 300 and may require a third connection (not shown) directly to the electrical storage device 105.

Figure 6:
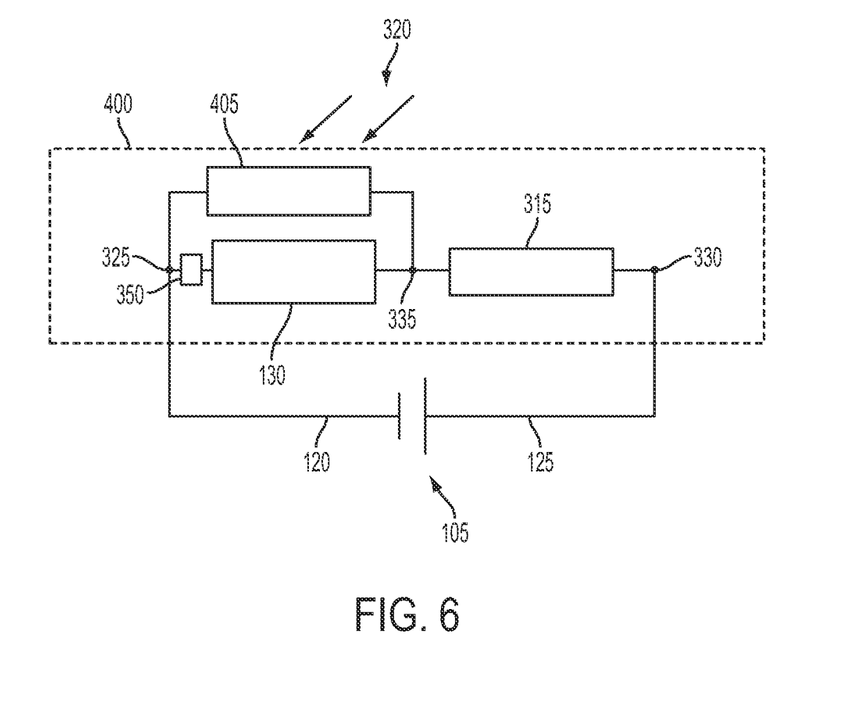
FIG. 6 depicts a parallel receptor circuit according to one or more embodiments shown and described herein.

Referring to FIG. 6, a parallel receptor circuit 400 is shown as another embodiment of the light activated power indicator 100 of FIGS. 1 and 2. Generally, the parallel receptor circuit 400 is shown within the imaginary box. In the parallel receptor circuit 400, a low resistance photoresistor 405 and the indicator 130 are electrically coupled in parallel. The first node 325 may comprise the first terminal 120, the indicator 130, and the low resistance photoresistor 405 all electrically coupled together. Alternatively, the first node 325 may further comprise the display resistor 350 electrically coupled to the first terminal 120, the indicator 130, and the low resistance photoresistor 405. The second node 330 may comprise the second terminal 125 electrically coupled to the leakage resistor 315 or in another embodiment; the second node may be electrically coupled to the third node 335 without the need for the leakage resistor 315. The third node 335 may comprise the indicator 130, the low resistance photoresistor 405, and the leakage resistor 315 all electrically coupled together.

The low resistance photoresistor 405 is a light sensitive device that has a low resistance when the low resistance photoresistor 405 is not exposed to wavelengths lying within the response spectrum of the electromagnetic spectrum 320, a high resistance when the low resistance photoresistor 405 is exposed to the wavelengths lying within the response spectrum of the electromagnetic spectrum 320, and an intermediate resistance (i.e. resistances falling between the high resistance and the low resistance) dependent upon the intensity of and/or the exposure to the wavelengths lying within the response spectrum of the electromagnetic spectrum 320 of the low resistance photoresistor 405. The low resistance of the low resistance photoresistor 405 may be the off display state of the parallel receptor circuit 400 and may not allow the indicator 130 to display the state of charge of the electrical storage device 105. The high resistance and/or the intermediate resistance of the low resistance photoresistor 405 may be the on display state of the parallel receptor circuit 400 and thus allow the indicator 130 to display the state of charge of the electrical storage device 105.

The low resistance photoresistor 405 may be replaced with a phototransistor in the parallel receptor circuit 400. The phototransistor would vary the current between the first node 325 and the third node 335 in response to the wavelengths lying within the response spectrum instead of varying resistance. Furthermore, the light sensitive device of FIG. 6 may be powered directly from the electrical storage device 105 if needed. For example, the photo transistor would require more than the first node 325 and the third node 335 to electrically couple within the parallel receptor circuit 400 and may require a third connection directly to the electrical storage device 105.

In the off display state, the indicator 130 may be off and not use any current from the electrical storage device 105. The leakage resistor 315 may be electrically coupled in series with the parallel combination of the indicator 130 and the low resistance photoresistor 405. The leakage resistor 315 may be sized to assure that a very low standby current passes through the low resistance photoresistor 405. In the parallel receptor circuit 400, the leakage resistor 315 may be greater than about 1.5 MOhms to prevent current from draining the electrical storage device 105 in the parallel receptor circuit 400.

The light activated power indicator 100 may further comprise a display resistor 350 as shown in FIGS. 5 and 6. This display resistor 350 may be used to limit an amount of current to the indicator 130 to ensure that the indicator 130 does not turn on or display the state of charge of the electrical storage device 105 when the high resistance photoresistor 305 or the low resistance photoresistor 405 is not exposed to the wavelengths lying within the response spectrum. In other words, the display resistor 350 may be used to deactivate the indicator 130 when the light sensitive device is not exposed to the one or more wavelengths of the response spectrum or when the response spectrum is present but not strong enough in intensity to activate the light sensitive device. The display resistor 350 may also be sized to stop or limit the current to the indicator 130 when the wavelengths lying within the response spectrum is above and/or below respective spectrum thresholds. For example, a respective spectrum threshold may be that the minimum amount of ambient light required for activation of the indicator 130 may be in the range of about 10Lux to about 50Lux. This example assumes that the response spectrum includes wavelengths lying within the ambient light range. In other words, the spectrum threshold may define an electromagnetic radiation limit of the wavelengths lying within the response spectrum that is either too low or too high to turn on the indicator 130 (depending on which type of light sensitive device and receptor circuit configuration is present). This may ensure that the light activated power indicator 100 does not drain power from the electrical storage device 105. Furthermore, the display resistor 350 may be sized to allow the indicator 130 to be on when indirect light is present. Indirect light may include reflected light off of a surface and does not include direct (e.g. line of sight) light from a light source.

In another embodiment, a shipping package containing at least one electrical storage device 105 with light activated power indicator 100 as shown, for example, in FIG. 1, may be opaque to the wavelengths lying within the response spectrum (e.g. non-visible spectrum) and transparent to rest of the electromagnetic spectrum. The high resistance photoresistor 305 and/or the low resistance photoresistor 405 may be doped with silicon or other materials as described above. In this embodiment, the silicon doping of the high resistance photoresistor 305 and/or the low resistance photoresistor 405 requires the wavelengths lying within the response spectrum to comprise the non-visible spectrum of the electromagnetic spectrum 320. This configuration allows the batteries, to include the light sensitive device, to be seen with the visible spectrum of the electromagnetic spectrum 320 while in the shipping packaging, but prevents the light activated power indicator 100 from being turned on (activated). By preventing this unnecessary activation, this embodiment may prevent the shortening of the indicator's 130 and the electrical storage device's 135 service life while in storage. In other words, when the light activated power indicator 100 is not exposed to the wavelengths lying within the response spectrum, the light activated power indicator 100 is deactivated. When deactivated, the light activated power indicator either does not draw power from the electrical storage device 105 or reduces its power consumption such that it does not diminish the shelf life of the electrical storage device 105. For example, the service life of the indicator 130 may be about 10 years or more in the deactivated state and about a month in the activated state.

FIG. 7 depicts a label 700 secured to the electrical storage device 105. The light activated power indicator 100 may be secured to the label 700 as described above and be segmented into one or more light activated power indicators 100a, 100b, 100c, 100d, 100e, 100f. The first terminal 120 and the second terminal 125 electrically couple the light activated power indicator 100 to the electrical storage device 105 when the label 700 is secured to the electrical storage device 105. The label 700 may include mounting tabs (not shown) or other structure to secure the label 700 to the electrical storage device 105. In one embodiment, the label 700 may be secured or formed to the external shape of a battery by an adhesive or a friction fit. Alternatively, in another embodiment, the label 700 may be a shrinkable material that is placed over the electrical storage device 105 and thermally activated to shrink to secure the label 700 to conform to the shape of the electrical storage device 105. In yet another embodiment, the label 700 may consist of a curable material that is either chemical or light activated to cure and secure to the label 700 to the electrical storage device 105.

Still referring to FIG. 7 the light activated power indicator 100 may be used to provide a visual display of the state of charge or energy level (e.g. an amount of power, voltage, or current) of the electrical storage device 105. The visual display may be in the form of a graduated bar, a graduated pie chart, a numerical display, a color-changing indicator, or a segmented strip 705. In one embodiment, the segmented strip 705 may be configured to indicate various states of charge (e.g. level of energy, threshold of energy, or amount of energy) of the electrical storage device 105. For example, the segmented strip 705 may allow for the monitoring of the state of charge (i.e. remaining energy or power) of the electrical storage device 105 as the electrical storage device 105 is depleted. The segments of the segmented strip 705 may be activated sequentially or cumulatively by separate electronic circuitry to provide the desired battery status information to a user. Furthermore, the segments of the segmented strip 705 may be activated from left to right, from right to left, from a center of the segmented strip 705 to both ends, or from both ends to the center. In one embodiment, the segments of the light activated power indicator 100 may be one or more light activated power indicators 100a, 100b, 100c, 100d, 100e, 100f and are electrically coupled to the electrical storage device 105 via the first terminal 120 and the second terminal 125. FIG. 7 illustrates six light activated power indicators 100a, 100b, 100c, 100d, 100e, 100f; however it should be understood that the embodiment shown in FIG. 7 is not limited to only six light activated power indicators 100a, 100b, 100c, 100d, 100e, 100f.

The segments of the segmented strip 705 may be activated sequentially or cumulatively by separate electronic circuitry to provide the desired battery status information to a user. The entire set of display and segment control electronics will be activated or deactivated by control from the light activated power indicator 100.

Figure 8:
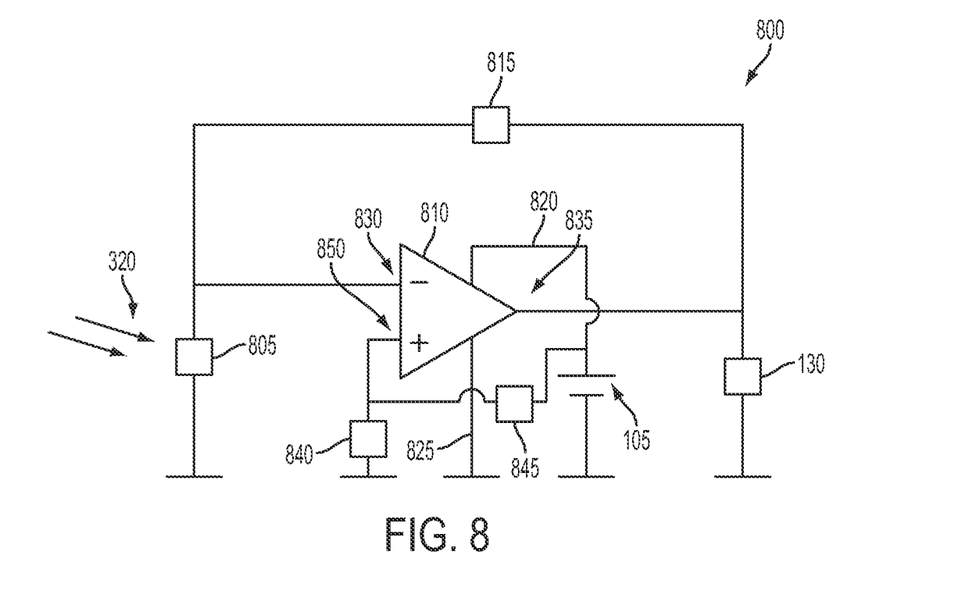
FIG. 8 depicts an op-amp light activated indicator according to one or more embodiments shown and described herein.

Referring now to FIG. 8, an op-amp receptor circuit 800 is shown. The op-amp receptor circuit 800 comprises an op-amp 810 in an inverting amplifier configuration. In this embodiment, the light sensitive device is a photodiode 805 and the inverting amplifier configuration of the op-amp 810 and the photodiode 805 are part of the negative feedback loop of the op-amp 810 and may also be known as a transresistance amplifier circuit. In this embodiment, the photodiode 805 generates a photodiode current when it is exposed to the wavelengths lying within the response spectrum. The op-amp 810 converts the photodiode current into an output voltage 835 that is used to power the indicator 130. A first power connection 820 and a second power connection 825 provide power for the op-amp 810. The positive input 850 is set to a threshold voltage by a first threshold resistor 840 and a second threshold resistor 845 acting as a voltage divider. The op-amp 810 is strapped with a gain resistor 815. When the photodiode 805 is activated by the response spectrum of the electromagnetic spectrum 320, the voltage at an inverting input 830 drops below the threshold voltage set by the voltage divider at the positive input 850 and the op-amp 810, acting as a comparator by comparing the threshold voltage at the positive input 850 to the photodiode current at the inverting input 830, turns on the output voltage 835 across the indicator 130 from about zero volts to about the electrical storage device 105 voltage. A rail to rail output voltage of the op-amp 810 is preferred for the output voltage 835 of the op-amp 810 as described in "1-Volt Operational Amplifier with Rail-to-Rail Input and Output Ranges" by Jeroen Fonderie, Marinus G. Maris, Johan H. Huijsing, Delft University of Technology, Delft, The Netherlands which is herein incorporated by reference in its entirety. The gain resistor 815 may be tailored or sized to account for the specific photodiode 805 being used. In other words, the gain resistor 815 may be sized to obtain the maximum performance from the photodiode 805 for the estimated response spectrum that the op-amp receptor circuit 800 may be exposed to. When the electrical storage device 105 is in a low-light condition (low intensity or minimal exposure to the response spectrum), the op-amp receptor circuit 800 will keep the output voltage 835 at about a zero voltage or about below the indicator 130 activation threshold (which, for example, may be about 0.3-0.4V). When the photodiode 805 is exposed to the electromagnetic spectrum 320, and the electromagnetic spectrum 320 includes the response spectrum, the output voltage 835 of the op-amp 810 will switch to a voltage close to the electrical storage device 105 voltage and activate the indicator 130 to display the state of charge of the electrical storage device 105.

The light activated power indicator uses a light sensitive device to determine when the light activated power indicator should be powered. This ensures that the limited life of the indicator may be preserved for use only when needed by a user to aid in determining when the electrical storage device has depleted or is near depleting its stored energy. The light activated power indicator lengthens the "shelf-life" of the indicator and the electrical storage device. This also ensures that the light activated power indicator, which may derive its power to function from the electrical storage device, is only powered when needed and does not needlessly drain energy from the electrical storage device. The light activated power indicator does not require any actuation or activation of any part or component of the light activated power indicator on the part of the user to determine the state of charge of the electrical storage device.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Certain terminology is used in the disclosure for convenience only and is not limiting. The words "left", "right", "front", "back", "top", "bottom", "upper", and "lower" designate directions in the drawings to which reference is made. The terminology includes the words noted above as well as derivatives thereof and words of similar import.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A light activated power indicator, comprising:
   an indicator;
   a receptor circuit comprising a light sensitive device electrically coupled to the indicator, the light sensitive device comprises electrical characteristics that change when the light sensitive device is exposed to one or more wavelengths lying within a response spectrum;
   a first terminal electrically coupled to a first end of the receptor circuit;
   a second terminal electrically coupled to a second end of the receptor circuit
   wherein the first terminal and the second terminal are coupled to an electrical storage device and the indicator indicates a state of charge of the electrical storage device when the light sensitive device is exposed to the one or more wavelengths lying within the response spectrum;
   wherein the receptor circuit further comprises a leakage resistor in parallel with the indicator, the light sensitive device is in series with the indicator, and wherein the light sensitive device is a high resistance photoresistor.

2. The light activated power indicator of claim 1, wherein the response spectrum comprises either one or more non-visible wavelengths of the electromagnetic spectrum or one or more visible wavelengths of the electromagnetic spectrum.

3. The light activated power indicator of claim 1, further comprising a substrate wherein the receptor circuit is coupled to a first side of the substrate and a second side of the substrate is coupled to the electrical storage device.

4. The light activated power indicator of claim 1, wherein the light sensitive device is printed on the indicator.

5. The light activated power indicator of claim 1, wherein the indicator includes at least one of the following: an electrochromic display, a thermochromic display, an electro-wetting display, a structural color display, an electrophoretic display, and an electrostatic display.

6. The light activated power indicator of claim 1, wherein the receptor circuit further comprises an op-amp in an inverting amplifier configuration and the light sensitive device comprises a photodiode, the photodiode is part of a negative feedback loop of the op-amp.

7. The light activated power indicator of claim 1, wherein the receptor circuit further comprises a signal conditioner or a comparator circuit.

8. The light activated power indicator of claim 1, wherein the receptor circuit further comprises a display resistor that limits an amount of current to the indicator so that the indicator deactivates when the light sensitive device is not exposed to the one or more wavelengths of the response spectrum, and the display resistor is in series with the indicator.

9. The light activated power indicator of claim 1, wherein the receptor circuit further comprises a display resistor that limits an amount of current to the indicator so that the indicator deactivates when the light sensitive device is exposed to the response spectrum but an intensity of the response spectrum is not strong enough for the light sensitive device to change its electrical characteristics, and the display resistor is in series with the indicator.

10. The light activated power indicator of claim 1, wherein the electrical storage device is a battery, and the first terminal is electrically coupled to a first electrode of the battery and the second terminal is electrically coupled to a second electrode of the battery.

11. The light activated power indicator of claim 1, wherein the electrical storage device is a capacitor, and the first terminal is electrically coupled to a positive terminal of the capacitor and the second terminal is electrically coupled to a negative terminal of the capacitor.

12. A method of observing a state of charge of an electrical storage device, comprising:
   powering a light activated power indicator from an electrical storage device;
   deactivating the light activated power indicator when a light sensitive device is not exposed to one or more wavelengths lying within a response spectrum to reduce a power consumption of the light activated power indicator, the light activated power indicator comprises:
an indicator,
a receptor circuit comprises the light sensitive device electrically coupled to the indicator, the light sensitive device comprises electrical characteristics that change when the light sensitive device is exposed to the one or more wavelengths lying within the response spectrum; and
a leakage resistor in parallel with the indicator, the light sensitive device is in series with the indicator, and wherein the light sensitive device is a high resistance photoresistor wherein the leakage resistor prevents a low leakage current through the light sensitive device to activate the indicator;
responding to exposure to the one or more wavelengths lying within the response spectrum by changing the electrical characteristics of the light sensitive device;
determining a state of charge of the electrical storage device through an electrical potential provided across the indicator; and
indicating the state of charge of the electrical storage device on the indicator.

13. The method of claim 12, wherein the response spectrum comprises either one or more non-visible wavelengths of the electromagnetic spectrum or one or more visible wavelengths of the electromagnetic spectrum.

14. The method of claim 12, wherein the receptor circuit further comprises a display resistor and the method further comprises limiting an amount of current to pass through the indicator using the display resistor so that the indicator deactivates when the indicator is not exposed to the response spectrum.

15. The method of claim 12, wherein the receptor circuit further comprises a display resistor and the method further comprises limiting an amount of current to the indicator so that the indicator deactivates when the response spectrum is present but not strong enough to activate the light sensitive device.

16. A light activated power indicator that operates in a presence of visible light to indicate a state of charge of a battery, comprising:
an indicator;
a receptor circuit comprising:
a leakage resistor electrically coupled to the indicator,
a display resistor electrically coupled to the indicator, and
a light sensitive device electrically coupled to the indicator, the light sensitive device comprises electrical characteristics that change when the light sensitive device is exposed to one or more wavelengths lying within a response spectrum;
a battery comprising a first electrode and a second electrode, the first electrode is electrically coupled to a first end of the receptor circuit and the second electrode electrically coupled to a second end of the receptor circuit;
wherein the indicator indicates a state of charge of the battery when the light sensitive device is exposed to the one or more wavelengths lying within the response spectrum.

* * * * *